(No Model.)

S. M. RAINES.
BAKER'S OVEN.

No. 340,354. Patented Apr. 20, 1886.

WITNESSES:
F. McArdle.
C. Sedgwick.

INVENTOR:
S. M. Raines
BY Munn & Co.
ATTORNEYS.

UNITED STATES PATENT OFFICE.

SOLOMON M. RAINES, OF LOGANSPORT, INDIANA.

BAKER'S OVEN.

SPECIFICATION forming part of Letters Patent No. 340,354, dated April 20, 1886.

Application filed April 21, 1885. Serial No. 162,938. (No model.)

*To all whom it may concern:*

Be it known that I, SOLOMON M. RAINES, of Logansport, county of Cass, Indiana, have invented a new and useful Improvement in Baking-Ovens, of which the following is a full, clear, and exact description.

The object of my invention is to provide a new and improved economical baking-oven, which is simple in construction and effective in use, and takes very rapidly.

The invention consists in the arrangement and combination of parts and details, as will be fully set forth and described hereinafter, and pointed out in the claim.

Reference is to be had to the accompanying drawings, forming part of this specification, in which similar letters of reference indicate corresponding parts in all the figures.

Figure 1:
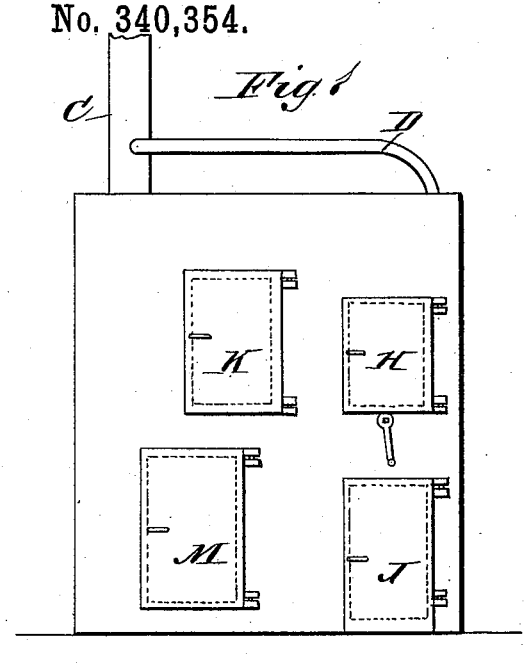
Figure 2:
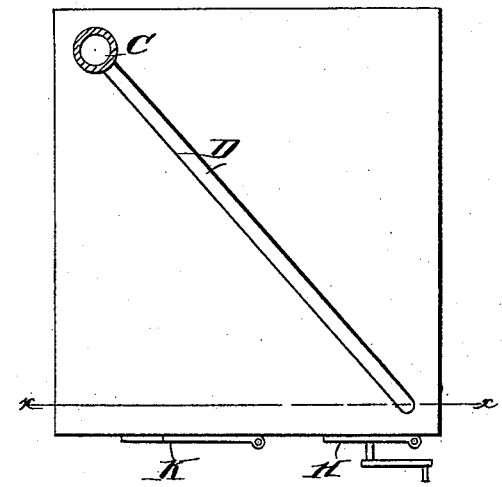
Figure 3:
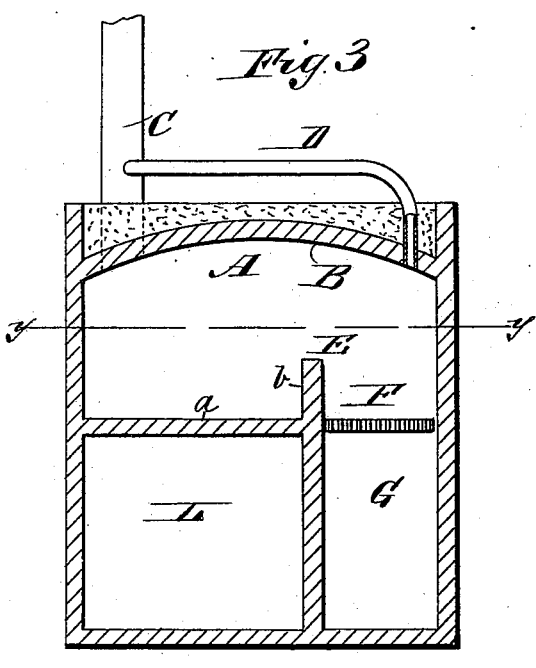
Figure 4:
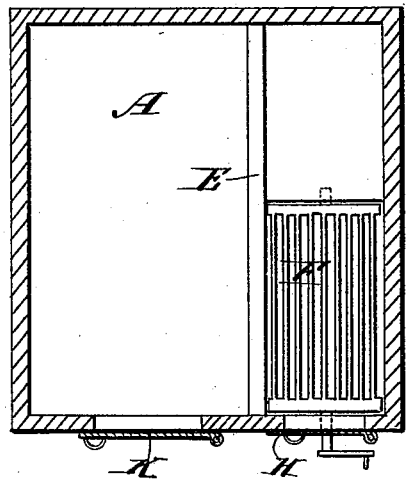

Figure 1 is a front view of my improved baking-oven. Fig. 2 is a plan view of the same, the smoke-pipe being in section. Fig. 3 is a cross-sectional elevation of the same on the line $x$ $x$, Fig. 2. Fig. 4 is a sectional plan view on the line $y$ $y$, Fig. 3.

The baking-oven A is provided with the arched top B, from one corner of which the smoke-pipe C extends upward. From the diagonally-opposite corner a pipe, D, extends upward and connects with the smoke-pipe C, and serves to carry off the gases accumulating in the top of the oven.

A short distance from one side of the oven the longitudinal partition or fire-wall E projects upward, as at $b$, from the floor $a$ of the oven, and between the said fire-wall and the side of the oven the grate F is placed, below the pipe D, and below which grate the ash-pit G is arranged.

H is the furnace-door, J the ash-pit door, and K the oven-door.

Below the oven and at the side of the ash-pit a chamber, L, is formed provided with a door, M. In the said chamber the dough is placed to rise.

The chamber L is heated by radiation from the bottom of the oven and the side of the ash-pit.

Having thus described my invention, I claim as new and desire to secure by Letters Patent—

An improved baking-oven having its grate F on a level with the bottom of the said oven, and provided with the wall E, projecting upward between the bottom and grate, and the vent-pipe D, extending from directly over the grate to the outside of the oven, and thence across the same to the chimney, substantially as herein shown and described.

SOLOMON M. RAINES.

Witnesses:
CHARLES E. HALE,
JOHN G. MEEK.